United States Patent [19]
Dal Pozzo

[11] Patent Number: 5,299,907
[45] Date of Patent: Apr. 5, 1994

[54] DEVICE FOR TRANSFERRING FLAT ARTICLES, IN PARTICULAR BLISTER PACKS, FROM A CONVEYOR OF TABLETS TO A MAGAZINE AND VICE-VERSA

[75] Inventor: Corrado Dal Pozzo, Imola, Italy

[73] Assignee: I.M.A. Industria Macchine Automatiche S.p.A., Ozzano Emilia, Italy

[21] Appl. No.: 707,590

[22] Filed: May 30, 1991

[30] Foreign Application Priority Data

Jun. 7, 1990 [IT] Italy ............................... 3545 A/90

[51] Int. Cl.[5] .................................................. B65G 59/06
[52] U.S. Cl. ............................... 414/797.8; 198/370
[58] Field of Search ................. 414/797.8, 795.3; 198/357

[56] References Cited

U.S. PATENT DOCUMENTS

| | | | |
|---|---|---|---|
| 3,655,072 | 4/1972 | Bateman | 414/797.8 |
| 4,238,025 | 12/1980 | Manservisi | 198/370 |
| 4,792,033 | 12/1988 | Iwata et al. | 198/357 |
| 4,874,076 | 10/1989 | Kapian et al. | 198/370 |
| 5,106,260 | 4/1992 | Obrecht | 414/797.8 |

FOREIGN PATENT DOCUMENTS

| | | | |
|---|---|---|---|
| 0245042 | 5/1963 | Australia | 414/795.3 |
| 0247419 | 9/1992 | European Pat. Off. | |
| 2807891 | 9/1979 | Fed. Rep. of Germany | 414/797.8 |
| 3730063 | 10/1988 | Fed. Rep. of Germany | 414/797.8 |
| 1511601 | 9/1992 | Fed. Rep. of Germany | |
| 0682369 | 2/1965 | Italy | 414/795.3 |

Primary Examiner—David H. Bollinger
Assistant Examiner—C. Wallace
Attorney, Agent, or Firm—Darby & Darby

[57] ABSTRACT

The device is used in conjunction with a step-driven conveyor featuring an upper surface where seats for receiving blister packs are placed with transverse portions of each blister packs protruding symmetrically from the relative seat. At a station where these seats stop one after the other, there is a vertical magazine, open below, centered with respect to the station and containing a stack of blister packs supported by spring-operated retaining means. Below the magazine, there are two arms one on each side of the upper surface, equipped above with suction cups, and vertically movable in a synchronous manner. Actuation of the arms, combined with action of the suction cups, enables a blister pack to be transferred from a seat present at the station to the magazine, and vice versa.

4 Claims, 3 Drawing Sheets

DEVICE FOR TRANSFERRING FLAT ARTICLES, IN PARTICULAR BLISTER PACKS, FROM A CONVEYOR OF TABLETS TO A MAGAZINE AND VICE-VERSA

BACKGROUND OF THE INVENTION

This invention concerns a device to be used in conjunction with a part of machine placed between a machine for packing various products in strips of blistered tape, commonly known as blister packs, and a device designed to stack these blister packs and then insert them into suitable containers, such as cartons.

The packaging machine is of the type which, observed from upstream to downstream, comprises a station where the blisters are formed out of thermoformable material, a station where the blisters are filled with a product (e.g., capsules pills and similar objects), a station where the presence of the product in the blisters is detected and/or where it is verified that the product placed in the blisters is not defective, a station where a film of aluminium foil is applied to seal the surface of the said tape where the blisters have their openings, and a station where the tape with the sealed blisters is cut up into blister packs.

The said section of the machine comprises a closed loop conveyor, whose upper surface is downstream with respect to the said cutting station.

The said conveyor is preferably formed of two adjacent belts, there being, on the outer side of each belt, crosspieces protruding right across the adjacent belt.

The crosspieces of the two belts form seats which receive the blister packs.

Transfer of the blister packs from the cutting station to the seats is effected by means of a technical solution, protected by Italian patent application No. 3544A/90 filed on the same date by the same applicant, which enables the blister packs to be oriented with their blisters facing upwards.

DESCRIPTION OF THE PRIOR ART

It is well-known that defective blister packs have to be rejected. This can be done for example, by applying a lateral force to the defective blister packs inserted into the said seats, in a transverse direction with respect to the direction of movement of the said upper surface, so as to eject them from the seats.

To optimize performance of the device designed to form the stacks of blister packs, which is at the end of the above-mentioned upper surface, the missing blister packs in the vacant seats (from which the defective blister packs have been discarded) must be replaced by other, non-defective ones.

This is done at present by providing the said upper surface with a magazine containing non-defective blister packs, upstream of the said device.

Suitable extracting means, if the magazine is situated beside the conveyor, or arms provided with vacuum-operated gripping means (suction cups), if the magazine is situated above the upper surface of the conveyor, collect the blister pack at the bottom of the stack of blister packs contained in the magazine in order to insert the blister pack into a vacant seat.

In this last case, ie with the magazine situated above the said upper surface, insertion of a blister pack into the vacant seat below can take place under the action of gravity, e.g. by opening, by means of a mechanical or electromechanical control, the spring-operated retaining means of the stack of blister packs contained in the magazine.

In known solutions, transfer of the blister packs takes place in one direction only, that is from the magazine towards the seats on the upper surface; consequently there is the problem of feeding the above-mentioned magazine with blister packs.

At present, feeding is effected manually by loading the magazine from above.

The magazine is fed with blister packs collected at the beginning of the above-mentioned upper surface, for example using the already mentioned technique of ejecting the blister packs from their seats, and then letting them fall, under the action of gravity, into a container placed below, from which they are removed manually, in order to load the magazine, manually, from above.

Obviously the ejection of non-defective blister packs from the upper surface is synchronised to coincide with a momentary interruption during which the cartoning machine does not pick up at least one carton (and corresponding leaflet) which the above-mentioned non-defective blister packs were to have filled.

Apart from having to use manual workers to load the magazine (with attendant costs), this work method is in distinct contrast with the high levels of technology and productivity achieved by blister packing machines, and machines which place such blister packs in cartons.

OBJECTS OF THE INVENTION

The object of this invention is to propose a device, so designed that it enables the vacant seats of a related conveyor to be fed, when required, with non-defective blister packs, and such, that it can feed itself when necessary with non-defective blister packs taken from the same conveyor, without negatively affecting the latter's operation and productivity.

Another object of the invention is to propose a device, as explained above, produced according to simple, reliable and functional mechanical principles.

A further object is to propose a device which functions no matter what size the blister packs are.

SUMMARY OF THE INVENTION

The above-mentioned objects are reached, by means of a device for transferring flat articles, in particular blister packs, from a conveyor for said flat articles to a magazine and vice versa.

The conveyor has at least one conveyor belt, narrower than said flat article is long, driven by a step motor so as to move in a closed loop and form an upper surface provided externally with crosspieces, with said crosspieces forming, on said upper surface, a plurality of seats located at a distance one from the other corresponding to a distance covered by said upper surface at each stepping movement.

The flat articles are inserted in the seats at the beginning of said upper surface by means of feed means, so that said flat articles are placed crosswise with respect to the upper surface and protrude over both longitudinal edges of it.

The device comprises a vertical magazine, open below, placed above said upper surface in a centered position with respect to a dwell station where said seats stop as a consequence of the operation of a step-motor drive of said conveyor.

A lower part of said magazine is provided with spring-operated means for retaining a stack of flat articles within said magazine, while the magazine has a rectangular cross-section, no smaller than the plan section of said flat articles.

At least two arms are attached to a vertical rod and respectively situated on each side of said upper surface, below said magazine, with gripping means fastened to a upper ends of said arms.

The rod is made to move vertically and synchronously with the stepping movement of said conveyor, thus forming two extreme and characteristic positions for said gripping means, namely a lowered position in which said gripping means are below a longitudinal planes occupied by portions of said flat articles protruding from said seats, and a raised position, in which said gripping means are situated at least at a level of a horizontal supporting plane provided by said retaining means of said stack.

The activation of said gripping means when said rod moves upward and when said gripping means meet with said portions, positioned above, of a flat article protruding from one of said seats situated in said dwell station, and the deactivation of said gripping means when at said raised position, cause the flat article to be transferred from said seat to said magazine and to become a lowermost flat article of said stack.

The activation of said gripping means, when at said raised position, causes said gripping means to release said lowermost flat article of said stack in said magazine, thus transferring said flat article to a vacant seat positioned below and on said belt, said vacant seat being situated at said dwell station and receiving said flat article because said gripping means are deactivated.

The proposed device performs a double function, in that it feeds vacant seats (which previously contained defective blister packs, ejected upstream of the device itself) with non-defective blister packs collected from a magazine, and when necessary it automatically feeds the same magazine, taking non-defective blister packs from the seats of the upper surface of a conveyor.

BRIEF DESCRIPTION OF THE DRAWINGS

The characteristics of the invention are set out below, with particular reference to the attached drawings, in which.

DESCRIPTION OF THE PREFERRED EMBODIMENT

Figure 1:
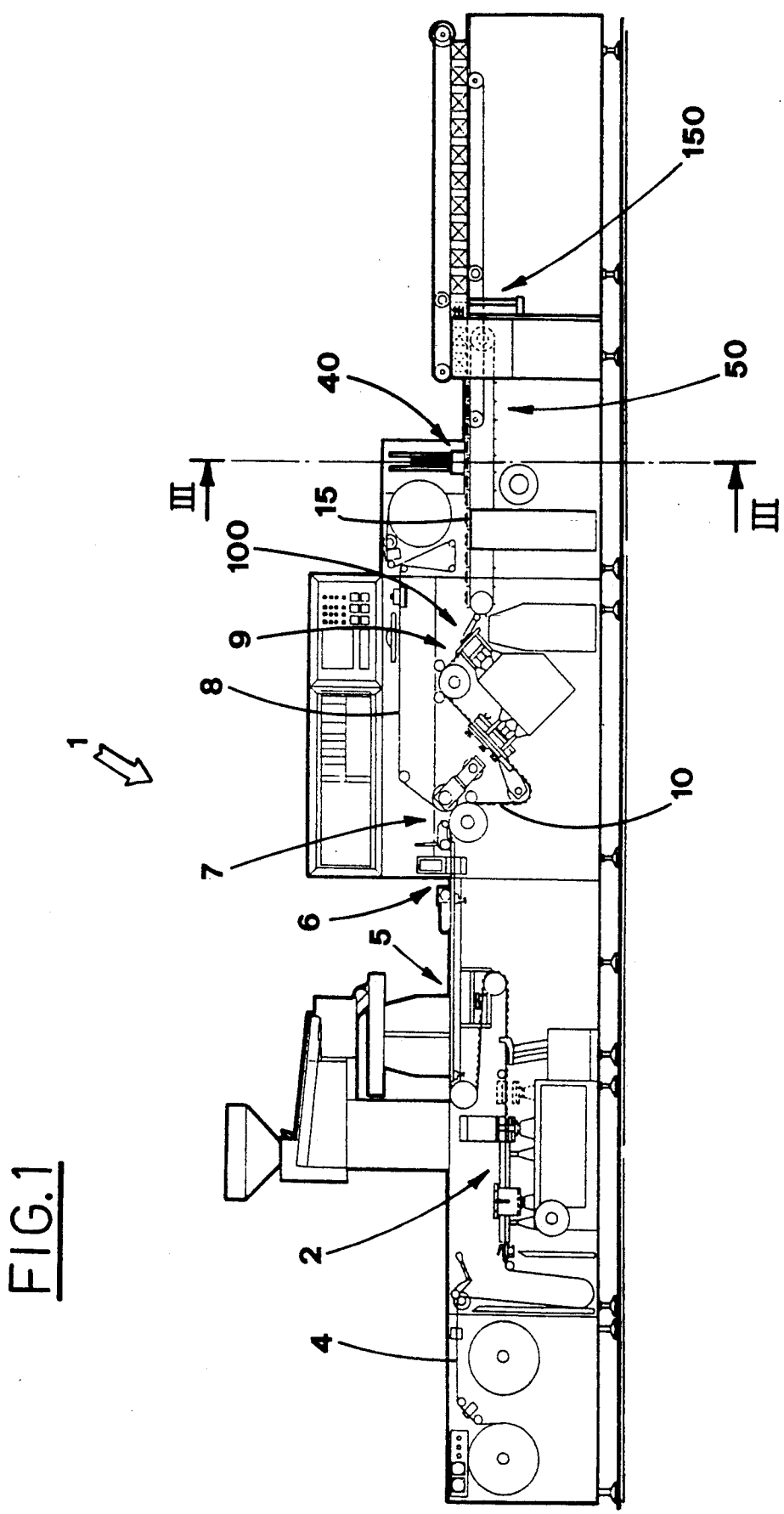
FIG. 1 is a side view of the machine with which this device is to combined, and upstream of the said section, a machine for packing different products in single blister packs.

With reference to the above-mentioned drawings, 50 indicates a part of machine downstream of a machine 1, the latter being of the type comprising, proceeding downstream:

a station 2 for forming blisters 3 on a tape 4 of thermoformable material;
a station 5 for filling the blisters 3 with a product (not shown), for example: capsules, pills and other similar objects;
a station 6 for detecting the presence of the product in the blisters, or alternatively, for detecting both the presence and the undamaged state of the product placed in the blisters 3;
a station 7 where a sealing foil 8 is applied to the surface of the tape 4 on the side where the blisters are open;
a station 9 where the sealed blister tape is cut into single blister packs 11.

The above-mentioned part of machine consists of a conveyor 15 the upper surface of which is oriented in a lengthwise fashion, downstream of the cutting station 9. The conveyor 15 consists of two adjacent belts 16a, 16b, driven synchronously in the direction S by a step motor. Each of the said belts is provided on its outer side with crosspieces, 17a, 17b, which protrude right across the adjacent belt so as to cover the entire width of the upper surface 14.

The crosspieces 17a, 17b of the two belts 16a, 16b form seats 18 which receive the above-mentioned blister packs 11.

Figure 2:
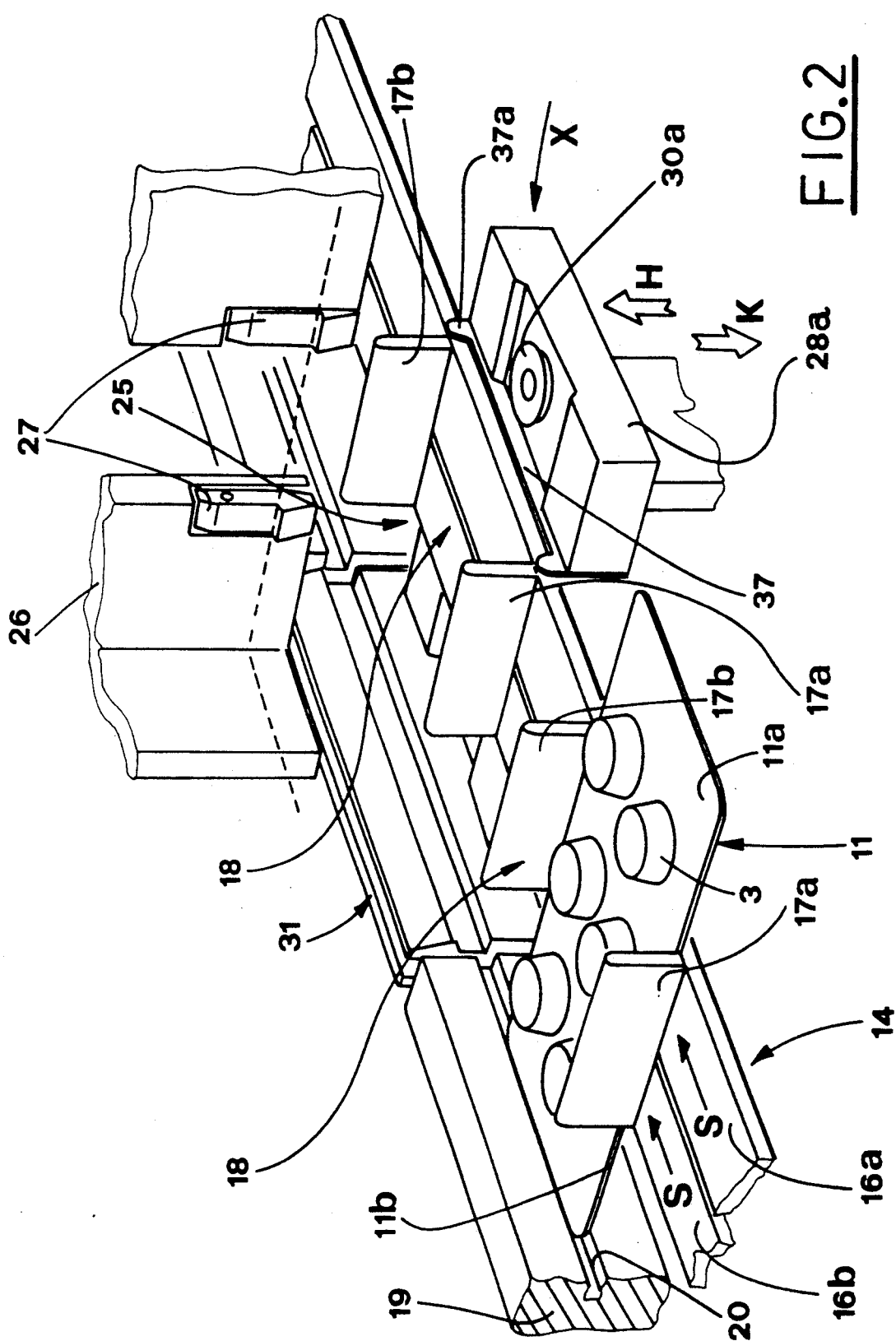
FIG. 2 shows an view, enlarged compared to FIG. 1, of detail 40 of FIG. 1, in a cutaway perspective view highlighting salient aspects of the invention.

It must be emphasised that the seats 18 are narrower than the blister packs are long; in this manner the ends 11a, 11b of each blister pack protrude crossways with respect to the seat 18. Symmetrically situated with respect to the longitudinal axis of the upper surface 18 there are two sidepieces 19 with a longitudinal groove 20 in the inner face of each which receive and guide the longitudinal edges of the blister packs (FIG. 2); in this manner the above-mentioned end portions 11a, 11b protrude symmetrically from the seat 18.

Transfer of the blister packs from the cutting station 9 to the seats 18 is effected by means of a device, indicated by 100, which enables each blister pack 11 to be inserted, with its blisters 3 facing upwards, into a corresponding seat 18; this device is protected by Italian patent application No. 3544A/90 filed on the same date by the same applicant.

The stepping movement of the conveyor 15 defines for the seats 18, at the level of the upper surface 14, a series of rest positions where each seat 18 of the upper surface 14 stops in turn.

The device 40 which is the subject of this invention is situated at one of these dwell stations marked 25 in the drawings.

Figure 3:
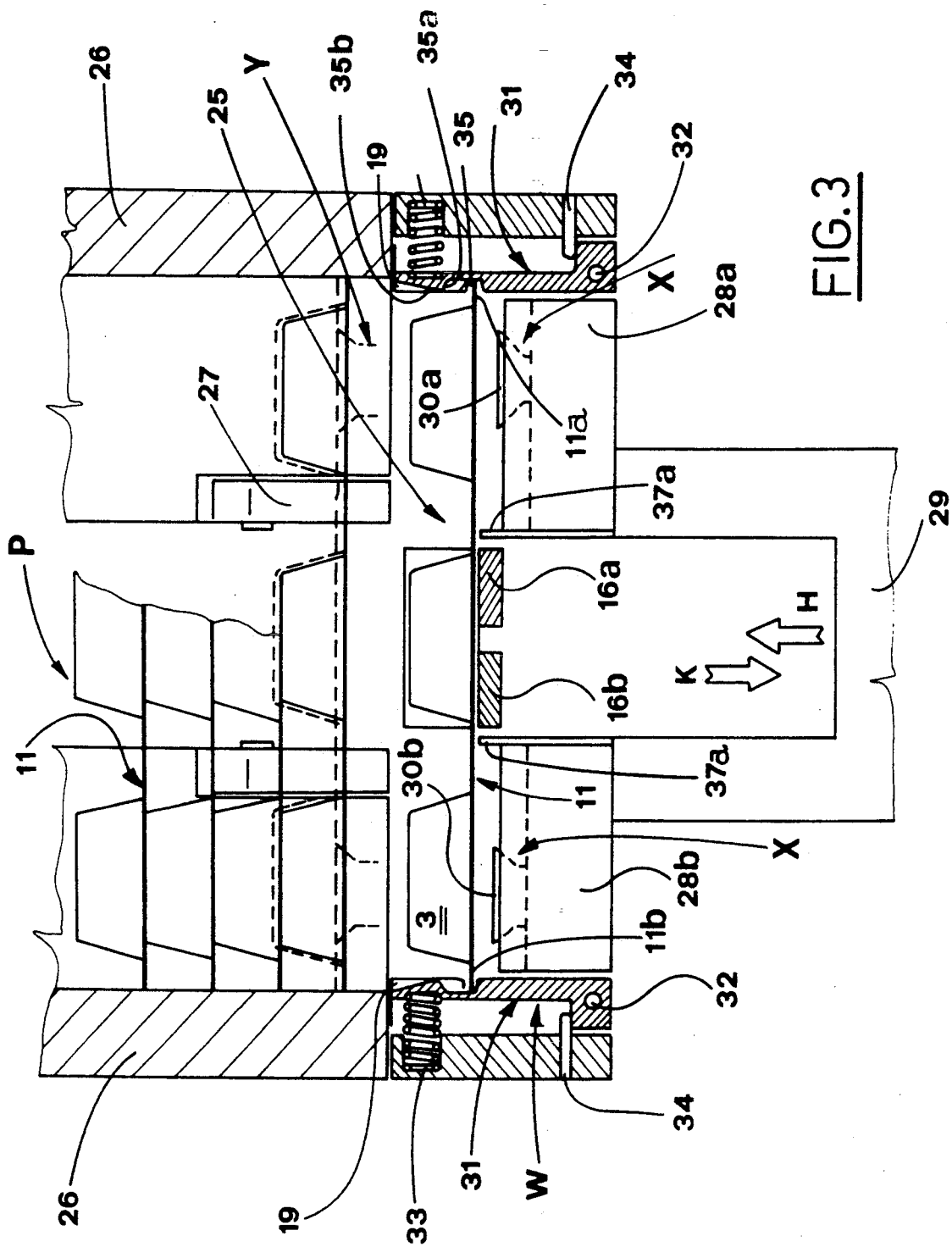
FIG. 3 shows an enlarged view of cross-section III-—III of FIG. 1.

The device 40 consists of a vertical magazine 26 (supported, in a known manner, by the structure of a part of machine 50), open below, with a rectangular cross-section no smaller than the plan section of the blister packs 11, placed above the upper surface 14 centrally with respect to the said station 25 (FIG. 3). The lower part of the magazine is provided with spring-operated retaining means 27 designed to support a stack P of blister packs 11 contained within the same magazine.

At each side of the upper surface 14 there is an arm; these arms 28a, 28b are attached to a vertical rod 29 which moves vertically, in the directions H, K, in a synchronised manner with the stepping movement of the conveyor 15; this movement takes place only when the conditions illustrated below are satisfied.

The arms 28a, 28b have respective suction cups 30a, 30b (the number of which depends on the size of the blister packs) which can be connected to a vacuum unit, not shown; these suction cups have a vertical axis and face upwards.

At the dwell station 25 the function of guide for the fixed sidepieces 19 is performed by a pair of movable sidepieces 31 situated downstream of the latter.

Each movable sidepieces 31 is hinged below to a fixed support, not shown, by means of a pin 32 which is parallel to the said upper surface 14; in this manner the same sidepiece is enabled to move. More precisely, movement in an outwards direction is opposed by a spring 33, while the extent of movement inwards is restricted by means of a pin 34 which, at rest, enables the movable sidepiece 31 to align with the corresponding fixed sidepiece 19 (rest position W of the movable sidepiece 31). The upper inside-facing part of each side has a longitudinal groove 35 (FIG. 3), which in the said rest position W is aligned with the groove 20 of the corresponding fixed sidepiece 19; this groove is delimited above by a rounded edge 35a which joins above with a sloped, outwards-facing surface 35b (FIG. 3).

The arms 28a, 28b are, at their longitudinal internal edges, flush with corresponding forks 37; the tooth-like projections 37a of each fork face upwards and form a guide complementary to the longitudinal section of the blister pack 11 and also symmetrical with respect to the transverse symmetry axis of the dwell station 25.

As stated previously, the rod 29 moves vertically in the directions H (rising) and K (descending). This movement defines two extreme characteristic positions for the suction cups 30a 30b, lowered X and raised Y.

In the lowered position X the suction cups are below the corresponding longitudinal planes occupied by portions 11a, 11b of the blister packs 11.

In the raised position Y the suction cups are slightly higher than the horizontal plane of support of the said stack P determined by retaining means 27.

From the above description it is clear how the device 40 operates.

Defective blister packs are rejected upstream of the said device; this can be effected, for example, at a dwell station (without fixed sidepieces 19) by subjecting the defective blister pack to a lateral force to eject the blister pack from its seat 18, and thus from the conveyor 15.

To optimize performance of the machine indicated by 150 in FIG. 1 (placed at the end part of the upper surface 14), and designed to form a stack of blister packs and then to insert this stack into corresponding cartons (using techniques not shown since they are unrelated to the invention) the rejected blister pack must be replaced with a non-defective blister pack; this is done in the following manner.

Synchronously with the positioning of the vacant seat 18 at the dwell station 25, the suction cups 30a, 30b assume the raised position Y; activation of these suction cups, and descent (towards K) of the rod 29, cause the retaining means 27 to release the blister pack 11 at the bottom of the stack P, and the same blister pack to be transferred into the said vacant seat 18 already positioned at the dwell station 25.

The presence of the forks 37 ensures that the blister pack thus collected is optimally centered with respect to the seat 18 below.

During this transfer, the longitudinal edges of the blister pack intercept the sloping surfaces 35b of the movable sidepieces 31, making these move outwards, until, on account of the reaction of the spring 33, they click into the longitudinal grooves 35.

Descent of the rod 29 then causes insertion of the blister pack 11 collected from the magazine 26 into the vacant seat 18 situated at the dwell station 25; the suction cups are deactivated synchronously with the clicking of the blister pack's longitudinal edges into the grooves 35, and so the blister pack, perfectly centered, occupies the said seat 18. In this manner a defective blister pack, rejected from the seat 18 upstream of the device 40, has been replaced by a blister pack taken from the magazine.

The quantity of blister packs in the magazine 26 must never fall below a preset limit; if it does (this can be detected using suitable sensors, not shown here), the magazine must be fed with nondefective blister packs.

This is synchronised to coincide with a momentary interruption during which the cartoning machine (not shown), with which the said device 150 is combined, does not pick up at least one carton (and corresponding leaflet).

At the same time that a seat 18 containing a blister pack is positioned in the dwell station 25, the rod 29 is forced to move upwards.

This causes the forks 37 to meet with the said blister pack, and the suction cups 30a, 30b to intercept the lower surface of the blister pack. Since these suction cups are activated, it follows that the blister pack is collected vertically from the seat 18 (perfectly centered with respect to the magazine above owing to the action of the forks 37) and without hindrance from the movable sidepieces 31 since the interference of the longitudinal edges of the blister pack, rising, against the rounded edges 35a of the grooves 35 causes a temporary, outward movement of the same movable sidepieces 31.

As the rod 29 progresses upwards it causes the edges of the blister pack to intercept the spring-operated retaining means 27, thus raising the stack P contained in the magazine.

The moment the suction cups (in the raised position Y) are deactivated, the above blister pack becomes the base of the stack P and it rests on the horizontal supporting plane provided by the said retaining means 27.

A central processing unit, not shown, monitors in a known way the number of blister packs in the stack contained in the magazine; automatic feeding of the latter is effected whenever this number falls below a preset minimum, and interrupted as soon as this number reaches a preset maximum number.

What is claimed is:

1. A device for transferring flat articles, in particular blister packs, from a conveyor to a magazine and vice versa comprising:

at least one conveyor belt of said conveyor being narrower than said flat article is long, a step motor to move said conveyor in steps in a closed loop, an upper surface of said conveyor provided externally with crosspieces forming on said upper surface a plurality of seats located at a distance one from the other corresponding to a distance covered by said upper surface at each stepping movement of said motor, a feed means for inserting said flat articles in said seats at the beginning of said upper surface crosswise with respect to said upper surface to protrude over both longitudinal edges of said upper surface;

a vertical magazine having an open bottom placed above said upper surface in a centered position with respect to a dwell station where said seats stop by the operation of said step-motor drive, spring-operated means at a lower part of said magazine for retaining a stack of flat articles within said magazine, said magazine having a rectangular cross-section no smaller than the plan section of said flat articles;

at least two arms attached to a vertical rod and respectively situated on each side of said upper surface, below said magazine, with gripping means fastened to upper ends of said arms, each of said arms having an internal longitudinal edge and a corresponding fork with upward-facing tooth-like projections flush with a said internal edge end forming a guide complementary to a longitudinal section of said flat articles and symmetrical with respect to a transverse axis of symmetry of said dwell station.

means for moving said rod vertically and synchronously with a stepping movement of said conveyor between two positions for said gripping means, a lowered position in which said gripping means are below a longitudinal plane occupied by portions of said flat articles protruding from said seats, and a raised position, in which said gripping means are situated at least at a level of a horizontal supporting plane provided by said retaining means of said stack, means for activation of said gripping means when said rod moves upward and when said gripping means meet with said portions positioned above a flat article protruding from one of said seats situated in said dwell station, and for deactivation of said gripping means when at said raised position, causing said flat article to be transferred from said seat to said magazine and to become a lowermost flat article of said stack;

means for activation of said gripping means, when at said raised position, causing said gripping means to release said lowermost flat article of said stack in said magazine, thus transferring said flat article to a vacant seat positioned below and on said belt, said vacant seat being situated at said dwell station and receiving said flat article because said gripping means are deactivated.

2. A device according to claim 1, wherein said gripping means comprises at least one suction cup.

3. A device for transferring flat articles, in particular blister packs, from a conveyor to a magazine and vice versa comprising:

a conveyor having at least one conveyor belt of said conveyor being narrower than said flat article is long, a step motor to move said conveyor in steps in a closed loop, an upper surface at said conveyor provided externally with crosspieces forming on said upper surface a plurality of seats located at a distance one from the other corresponding to a distance covered by said upper surface at each stepping movement of said motor, a feed means for inserting said flat articles in said seats at the beginning of said upper surface crosswise with respect to said upper surface to protrude over both longitudinal edges of said upper surface;

a vertical magazine having an open bottom placed above said upper surface in a centered position with respect to a dwell station where said seats stop by the operation of said step-motor drive, spring-operated means at a lower part of said magazine for retaining a stack of flat articles within said magazine, said magazine having a rectangular cross-section no smaller than the plan section of said flat articles;

at least two arms attached to a vertical rod and respectively situated on each side of said upper surface, below said magazine, with gripping means fastened to upper ends of said arms, each of said arms having an internal longitudinal edge, means for moving said rod vertically and synchronously with a stepping movement of said conveyor between two positions for said gripping means, a lowered position in which said gripping means are below a longitudinal plane occupied by portions of said flat articles protruding from said seats, and a raised position, in which said gripping means are situated at least at a level of a horizontal supporting plane provided by said retaining means of said stack, means for activation of said gripping means when said rod moves upward and when said gripping means meet with said portions positioned above a flat article protruding from one of said seats situated in said swell station, and for deactivation of said gripping means when at said raised position, causing said flat article to be transferred from said seat to said magazine and to become a lowermost flat article of said stack;

means for activation of said gripping means, when at said raised position, causing said gripping means to release said lowermost flat article of said stack in said magazine, thus transferring said flat article to a vacant seat positioned below and on said belt, said vacant seat being situated at said dwell station and receiving said flat article because said gripping means are deactivated, two longitudinal fixed sidepieces situated upstream of said dwell station and symmetrically with respect to said upper surface, each of said fixed sidepieces having on an inside face a longitudinal groove designed to receive and guide ends of said flat articles, two movable sidepieces downstream of said fixed sidepieces and beneath said magazine, each of said movable sidepieces having a longitudinal groove on an inside face and being joined to a fixed support by means of a pin located parallel to said upper surface, a spring-operated means which opposes movement of said movable sidepieces in an outwards direction, and blocking means for blocking movement in an inwards direction of said movable sidepieces, said blocking means and said spring-operated means forming a rest position for a relative movable sidepiece, said groove of said relative movable sidepieces in said rest position being aligned with a groove of a corresponding fixed sidepiece.

4. A device according to claim 3, wherein each of said longitudinal grooves is limited above by a rounded edge which joins a sloping, outward-oriented surface.

* * * * *